Jan. 12, 1965  R. E. KRUEGER  3,164,986
TORQUEMETER
Filed May 15, 1961
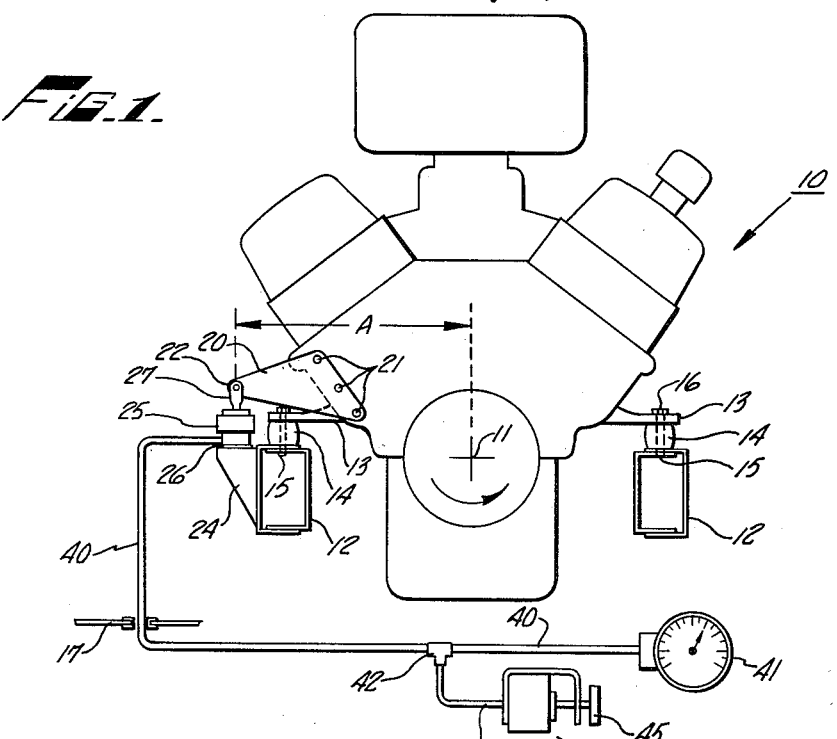
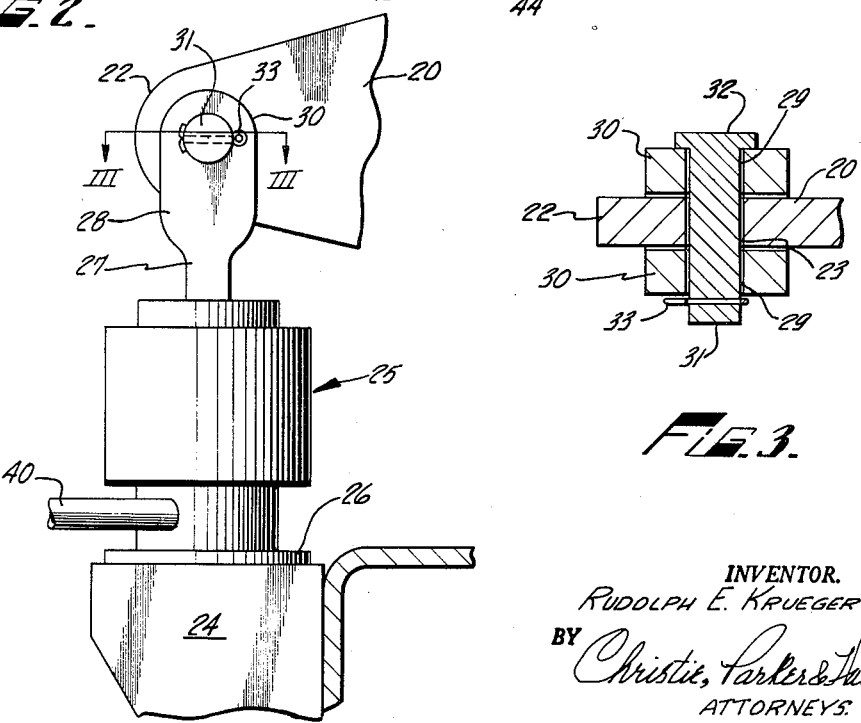
INVENTOR.
RUDOLPH E. KRUEGER
BY Christie, Parker & Hale
ATTORNEYS.

United States Patent Office 3,164,986
Patented Jan. 12, 1965

3,164,986
TORQUEMETER
Rudolph E. Krueger, 2808 N. Naomi St., Burbank, Calif., assignor of one-half to Woodson C. Deeds, North Hollywood, Calif.
Filed May 15, 1961, Ser. No. 109,958
1 Claim. (Cl. 73—136)

This invention relates to torquemeters. More particularly, it relates to torquemeters for installation in vehicles for use during actual operating conditions.

In the field of torquemeters and torque rating apparatus there are presently many highly refined instruments capable of determining the torque of a rotating-shaft prime mover with great precision and accuracy. It is because of the delicacy and great precision of these instruments that it is necessary that the motor to be tested be operated in a laboratory environment rather than under actual operating conditions.

As applied to automotive engines, the present practice is to obtain the torque characteristics of the engine in a garage or testing laboratory. However, once an engine has been modified or has gone through the relatively simple process of being tuned up, it is seldom that subsequent torque readings are made of the engine to determine the optimum level of performance for the engine. There is a demand for obtaining the torque characteristics of automobile engines, or even engines for use in boats or small airplanes, under actual road or operating conditions. The need for such on-the-spot or field measurement of torque is particularly present with the use of sports automobiles where the driver frequently has had the engine modified by either the addition of a modified camshaft, or a change in the carburetor system, or by modifying the exhaust or ignition system. In such cases as this, the torque characteristics may be changed greatly from those indicated by the factory performance curves. If the driver or operator of the vehicle seeks to obtain maximum performance from his engine, by knowing the most effective points at which to shift gears, it is necessary to know the true torque characteristic of the engine. It is not even enough to have a plot of the torque characteristic of the engine, since the performance of the engine will change under varying road conditions, and it is highly inconvenient to have a sheaf of graphs indicating the performance of any one engine.

Generally speaking, this invention comprises a torque measuring apparatus for installation within a vehicle having a rotary shaft propulsion unit supported on resilient mountings, which mountings in turn are fixed to a rigid frame or engine base. The torque measuring apparatus comprises in part a rigid torque arm fixed to the propulsion unit itself. A hydraulic pressure generating unit is provided for rigid mounting to the frame of the vehicle. A generating unit activating plunger is connected between the unit and torque arm. A pressure activated gauge is provided and is connected to the hydraulic pressure generating unit by means of a duct.

The following detailed description and explanation of the torque measuring apparatus of this invention is made in conjunction with the attached figures, wherein:

FIGURE 1 is a firewall end view of an automobile engine on its frame supports to show the entire torque measuring apparatus installed thereon;

FIGURE 2 is an enlarged fragmentary view of the hydraulic bellows unit; and

FIGURE 3 is a further enlarged cross-sectional view of the connection between the bellow activating plunger and the torque arm as taken along line III—III of FIGURE 2.

Referring to FIGURE 1, there is disclosed an internal combustion engine 10 having a rotary shaft whose center line or axis of rotation is indicated at 11. Engine 10 is mounted between a pair of frame members 12 and is supported thereon by means of horizontal mounting flanges or lugs 13 extending laterally from each side of the engine 10. A resilient block 14, preferably fabricated from heavy rubber, is provided between the lugs 13 and the frame 12 for cushioning and vibration-damping of the engine. A stud 15 extends from tthe frame 12 through each resilient mounting 14 and lug 13 and is secured to the engine 10 by a nut 16. The engine 10 is shown illustrated in an engine compartment having a firewall 17.

A torque arm 20 is fixed rigidly to engine 10 as by bolts 21, and extends from the engine 10 to an end 22 which has an aperture 23 therein. A pedestal 24 is rigidly attached to one of the frame members 12 below the end 22 of the torque arm 20. A hydraulic pressure generating unit such as a bellows 25 is mounted to the pedestal 24 by means of a flange 26 incorporated in the bottom of bellows unit 25. Preferably the bellows 25 is metallic to require a minimum deflection for operation. A bellows activating plunger or ram 27 extends upwardly from the bellows unit 25 and terminates in a yoke 28 having a pair of spaced apart lugs 30 at the upper end thereof disposed on opposite sides of the torque arm 20. Each lug has an aperture 29 formed therethrough coaxially of the aperture in the other lug. A pin 31 having one flanged end 32 is passed through the apertures 29 of the ram lugs 30 and through the aperture 23 in the end 22 of the torque arm to connect the ram 27 to the torque arm. Pin 31 is maintained relative to the yoke 28 by any conventional means, as, for instance, by a cotter pin 33 as illustrated in FIGURES 2 and 3.

A hydraulic duct 40 is connected to the base of bellows 25. A pressure activated gauge 41 is provided and preferably is calibrated directly in units of torque, as in foot-pounds or inch-pounds. In most cases where an internal combustion engine 10 is used as the prime mover for the vehicle in which the torque meter of this invention finds use, a firewall 17 defines or forms one side of the engine compartment. The hydraulic duct 40 extends from the bellows unit 24 through the firewall to the gauge 41. As illustrated in FIGURE 1, a T-joint or union 42 is provided in duct 40 from which a secondary duct 43 extends. The secondary duct 43 terminates in a hydraulic zero-adjustment unit 44 which, in this instance, is a diaphragm unit operated or controlled by a knob 45. However, the zero-adjustment unit 44 may be another bellows unit or a plunger device. Its primary function is to adjust the no-load pressure in the duct 40 and to provide a means whereby air bubbles formed in the system during installation of the meter may be bled so that no erroneous readings are produced.

The operation of the torque meter of this invention is according to conventional physical principles. As the motor 10 is operated under loads, the rotation of the motor shaft, indicated by center line 11, tends to cause the engine 10 itself to move in the opposite direction as the direction of rotation of the driven shaft. As the shaft 11 rotates, the motor 10 is restrained in a limited manner in such motion by the resilient mounting blocks 14. However, there is a slight amount of rotational displacement of the engine 10, and this displacement is reflected by the downward motion of the plunger 27 creating a pressure change in the bellows unit 24 which is reflected in duct 40 and in the pressure activated gauge 41. When the distance between the center line 11 of the engine shaft and the plunger 26 is known, this being indicated in FIGURE 1 by the distance "A," the only variable quantity in the system is of the pressure generated in the bellows. Thus, the pressure reflected at gauge 41 multiplied by the distance "A" provides an indication of the torque generated by engine 10. When the dial of gauge 41 is calibrated in units of torque, the actual torque of the engine 10 may be read directly. The advantage of this system is that a reasonably accurate measurement of torque developed by engine 10 may be observed while the car is actually in motion in actual service, rather than being isolated on a test stand in a laboratory.

The zero adjusting unit 44 is provided so that, if the idling speed of the engine is varied by an engine tune-up or by any other modification to the engine, the gauge 41 may be adjusted so that the engine idling speed corresponds to zero on the gauge 41.

The apparatus of this invention may also be used to measure reverse torque, that is: torque developed when the engine is running in a reverse rotational direction. In such case, the engine 10 tends to move such that the plunger 26 moves upwardly developing a negative pressure in the bellows 24; this negative pressure can be measured by the same gauge 41.

While the invention described above has been considered in conjunction with specific apparatus and in a specific installation, this description is by way of illustration only and should not be considered as a limitation on the scope of this invention.

The invention claimed is:

A torquemeter for indicating the torque output of a rotatable shaft of an engine secured by resilient mounts to a frame, the torquemeter comprising a rigid arm mounted on the engine, a bellows, a pressure gauge, a hydraulic duct connecting the gauge to the bellows, the bellows, duct and gauge being full of hydraulic fluid, means connecting the bellows between the frame and the rigid arm so the bellows is deformed and changes the pressure of the fluid in it as the engine develops torque, and means for adjusting the pressure on the hydraulic fluid independently of the engine torque to compensate for changes induced by variations in operating conditions.

References Cited in the file of this patent
UNITED STATES PATENTS

| | | |
|---|---|---|
| 1,730,173 | Stearns | Oct. 1, 1929 |
| 1,772,188 | Mason | Aug. 5, 1930 |
| 2,019,755 | Zerbe et al. | Nov. 5, 1935 |
| 2,135,394 | Geissen | Nov. 1, 1938 |
| 2,278,201 | Keller | Mar. 31, 1942 |
| 2,389,361 | Hagg et al. | Nov. 20, 1945 |
| 2,392,702 | Saunders | Jan. 8, 1946 |
| 2,638,781 | McDuffie et al. | May 19, 1953 |
| 2,680,967 | Newman | June 15, 1954 |
| 2,946,219 | Kemper | July 26, 1960 |